(12) United States Patent
Sundrani et al.

(10) Patent No.: US 11,232,032 B2
(45) Date of Patent: Jan. 25, 2022

(54) INCOMPLETE WRITE GROUP JOURNAL

(71) Applicant: Western Digital Technologies, Inc., San Jose, CA (US)

(72) Inventors: Kapil Sundrani, Bangalore (IN); Karimulla Sheik, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/937,067

(22) Filed: Jul. 23, 2020

(65) Prior Publication Data
US 2020/0356476 A1 Nov. 12, 2020

Related U.S. Application Data

(63) Continuation of application No. 16/236,815, filed on Dec. 31, 2018, now Pat. No. 10,733,098.

(51) Int. Cl.
*G06F 12/00* (2006.01)
*G06F 12/0804* (2016.01)
*G06F 12/02* (2006.01)

(52) U.S. Cl.
CPC ...... *G06F 12/0804* (2013.01); *G06F 12/0238* (2013.01); *G06F 12/0246* (2013.01); *G06F 2212/1032* (2013.01); *G06F 2212/217* (2013.01); *G06F 2212/262* (2013.01)

(58) Field of Classification Search
CPC ............. G06F 12/0804; G06F 12/0238; G06F 12/0246; G06F 2212/1032; G06F 12/217; G06F 12/262
See application file for complete search history.

(56) References Cited

U.S. PATENT DOCUMENTS

| | | | |
|---|---|---|---|
| 6,513,093 B1 | 1/2003 | Chen et al. | |
| 8,850,114 B2 | 9/2014 | Rosenband et al. | |
| 9,996,477 B2 * | 6/2018 | Chan | G06F 11/00 |
| 2013/0019057 A1 | 1/2013 | Stephens | |

* cited by examiner

*Primary Examiner* — Shawn X Gu
(74) *Attorney, Agent, or Firm* — Patent Law Works LLP

(57) ABSTRACT

Example storage systems, storage devices, and methods provide a write group journal for identifying incomplete writes. Related write request indicators are stored in a non-volatile journal in a solid state drive to identify a related write group and indicate whether the related write group has been stored in storage locations corresponding to physical page addresses. As the write requests for the related write group are processed, the related write request indicator is updated to allow incomplete write groups to be identified in the event of a failure.

20 Claims, 7 Drawing Sheets

INCOMPLETE WRITE GROUP JOURNAL

TECHNICAL FIELD

The present disclosure generally relates to data storage systems, and in a more particular example, to data storage systems with host management of recovery mechanisms for writing to physical storage locations.

BACKGROUND

Storage devices, such as solid state drives (SSDs) and hard disk drives (HDDs), have generally managed the logical-to-physical mapping for data written to the media devices within the drive, such as dies of flash memory or spinning magnetic disks. This may enable individual storage devices to internally manage defects, wear levelling, garbage collection, allocation of spare storage medium capacity, and other functions to meet device capacity and performance metrics.

Some data storage system configurations are being developed that expose the physical structure of the storage medium to enable host systems to manage input/output (I/O) to physical locations. For example, Open-Channel SSD defines a class of SSDs that expose the internal parallelism of the SSD to the host and allow the host to manage the I/O through physical page addressing (PPA). This open architecture may enable the host to divide the capacity of the SSD into logical units that map to the physical units of the media devices. Control of I/O at the PPA-level may also allow the host to aggressively manage latency by controlling when and where reads and writes are scheduled and placed within the SSD. Workload optimizations may be implemented within a custom flash translation layer (FTL), file system, or within host applications.

Some target storage devices, such as Open Channel SSDs, may not implement recovery mechanisms, such as redundant array of independent disk (RAID)-like configurations across media devices, write caching to non-volatile memory, and similar approaches for preventing data loss during I/O operations. Uncorrectable errors, such as errors that cannot be recovered through error correction codes (UECCs), may be relatively common with some storage mediums.

Host systems and applications may compensate for this risk of data loss by implementing RAID configurations across dies. These RAID group writes may be managed at the host-level in applications, such as Open Channel SSD, storage network interface card (NIC), RAID host bus adapter (HBA), that may be capable of physical addressing of I/O to storage device media devices.

In some configurations, maintaining atomicity across the write group may be a problem, such as when the storage device supports cached writes and does not support power fail protection. For performance reasons, the storage device may acknowledge writes after writing to volatile cache before they are flushed to the non-volatile media devices, such as flash. A power fail or similar event after writes have been acknowledged but before the data is written to storage locations in the flash memory, introduces potential write holes in the write group, such as a RAID stripe, that the host assumes is consistent. It may be difficult for the host to determine what write groups have or have not been completed in the event of a power failure, absent a consistency check or similar data scan. Consistency checks after a power failure may be prohibitively long and costly in terms of availability of the storage device and its data for I/O operations.

Therefore, there still exists a need for storage devices that enable group writes to physical storage locations, while protecting against data corruption from lost writes to the write group.

SUMMARY

Various aspects for managing write groups in storage devices, particularly, incomplete write group notifications are described. One general aspect includes a system, including at least one host device and a solid state drive configured to receive host write commands from the at least one host device. The solid state drive includes: a plurality of storage locations addressable with physical page addresses received from the at least one host device; a non-volatile journal configured to store a related write request indicator; and a command handler configured to send an event notification to the at least one host. The related write request indicator is configured to: identify a related write group that includes a plurality of physical page addresses; and indicate whether the related write group has been stored in the plurality of storage locations corresponding to the plurality of physical page addresses. The command handler is further configured to send, based on the related write request indicator, the event notification responsive to a data loss event, where the event notification indicates that the related write group was incomplete.

Implementations may include one or more of the following features. The related write group may be a redundant array of independent disks (raid) stripe. The solid state drive may further include: a cache memory configured to store a plurality of write data blocks for a plurality of write requests corresponding to the related write group; and a device manager configured to write, responsive to the plurality of write data blocks being stored in the cache memory, the related write group to the plurality of storage locations corresponding to the plurality of physical page addresses. The cache memory may be further configured to store metadata indicating a destination physical page address for each of the plurality of write data blocks stored in the cache memory. The command handler may be further configured to send an acknowledgement message to the at least one host for each cached write request of the plurality of write requests. The related write request indicator may be further configured to store a bitmap of the related write group, where the bitmap indicates which write data blocks of a plurality of write data blocks corresponding to the related write group have been stored in the plurality of storage locations corresponding to the plurality of physical page addresses. The non-volatile journal may be further configured to remove, in response to a plurality of write data blocks corresponding to the related write group being stored in the plurality of storage locations corresponding to the plurality of physical page addresses, the related write request indicator from the non-volatile journal. The solid state drive may further include a recovery scanner configured to: scan, in response to a drive power cycle, the non-volatile journal for at least one incomplete related write group; identify an incomplete related write group by the related write request indicator indicating that the related write group has not been stored in the plurality of storage locations corresponding to the plurality of physical page addresses; and generate, in response to identifying at least one incomplete related write group, a data loss event indicator for the data loss event, where the command handler sends, responsive to the data loss event indicator, the event notification. The command handler may be further configured to: receive a write group start command, where the write group start command includes the plurality of physical page addresses corresponding to the related write group. The write group start command may be fused to a write command for a first write data block in the related write group.

One general aspect includes a computer-implemented method including: storing a related write request indicator in a non-volatile journal in a solid state drive; and sending, responsive to a data loss event, an event notification to at least one host system. The related write request indicator is configured to: identify a related write group, where the related write group includes a plurality of physical page addresses corresponding to a plurality of storage locations in the solid state drive; and indicate whether the related write group has been stored in the plurality of storage locations. The event notification, responsive to the related write request indicator indicating that the related write group has not been stored at an event time of the data loss event, indicates that the related write group was incomplete.

Implementations may include one or more of the following features. The computer-implemented method may further include: storing a plurality of write data blocks for a plurality of write requests corresponding to the related write group in a cache memory in the solid state drive; and writing, responsive to the plurality of write data blocks being stored in the cache memory, the related write group to the plurality of storage locations corresponding to the plurality of physical page addresses. The computer-implemented method may further include storing a bitmap of the related write group in the non-volatile journal, where the bitmap indicates which write data blocks of a plurality of write data blocks corresponding to the related write group have been stored in the plurality of storage locations corresponding to the plurality of physical page addresses. The computer-implemented method may further include removing, in response to a plurality of write data blocks corresponding to the related write group being stored in the plurality of storage locations corresponding to the plurality of physical page addresses, the related write request indicator from the non-volatile journal. The computer-implemented method may further include: scanning, in response to a drive power cycle, the non-volatile journal for at least one incomplete related write group; identifying an incomplete related write group by the related write request indicator indicating that the related write group has not been stored in the plurality of storage locations corresponding to the plurality of physical page addresses; and generating, in response to identifying at least one incomplete related write group, a data loss event indicator for the data loss event, where sending the event notification is responsive to the data loss event indicator. The computer-implemented method may further include receiving a write group start command, where the write group start command includes the plurality of physical page addresses corresponding to the related write group.

One general aspect includes a storage device, including: a plurality of storage locations addressable with physical page addresses received from at least one host device; means for storing a related write request indicator; and means for sending, responsive to a data loss event, an event notification to the at least one host. The related write request indicator is configured to identify a related write group that includes a plurality of physical page addresses and indicate whether the related write group has been stored in the plurality of storage locations corresponding to the plurality of physical page addresses. The related write request indicator indicates that the related write group has not been stored at an event time of the data loss event and the event notification indicates that the related write group was incomplete.

Implementations may include one or more of the following features. The storage device may further include: a cache memory configured to store a plurality of write data blocks for a plurality of write requests corresponding to the related write group; and means for writing, responsive to the plurality of write data blocks being stored in the cache memory, the related write group to the plurality of storage locations corresponding to the plurality of physical page addresses. The storage device may further include means for storing a bitmap of the related write group, where the bitmap indicates which write data blocks of a plurality of write data blocks corresponding to the related write group have been stored in the plurality of storage locations corresponding to the plurality of physical page addresses. The storage device may further include means for identifying, in response to a drive power cycle, that the related write request indicator indicates that the related write group has not been stored in the plurality of storage locations corresponding to the plurality of physical page addresses, where the means for sending the event notification sends the event notification responsive to the means for identifying.

The various embodiments advantageously apply the teachings of data storage systems to improve the functionality of such computer systems. The various embodiments include operations to overcome or at least reduce the issues in the previous storage systems discussed above and, accordingly, are more reliable and scalable than other computer data storage architectures for some applications. That is, the various embodiments disclosed herein include hardware and/or software with functionality to improve the reliability and scalability of write groups, based on enabling storage devices to use a write group journal to identify incomplete write groups and notify a host. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
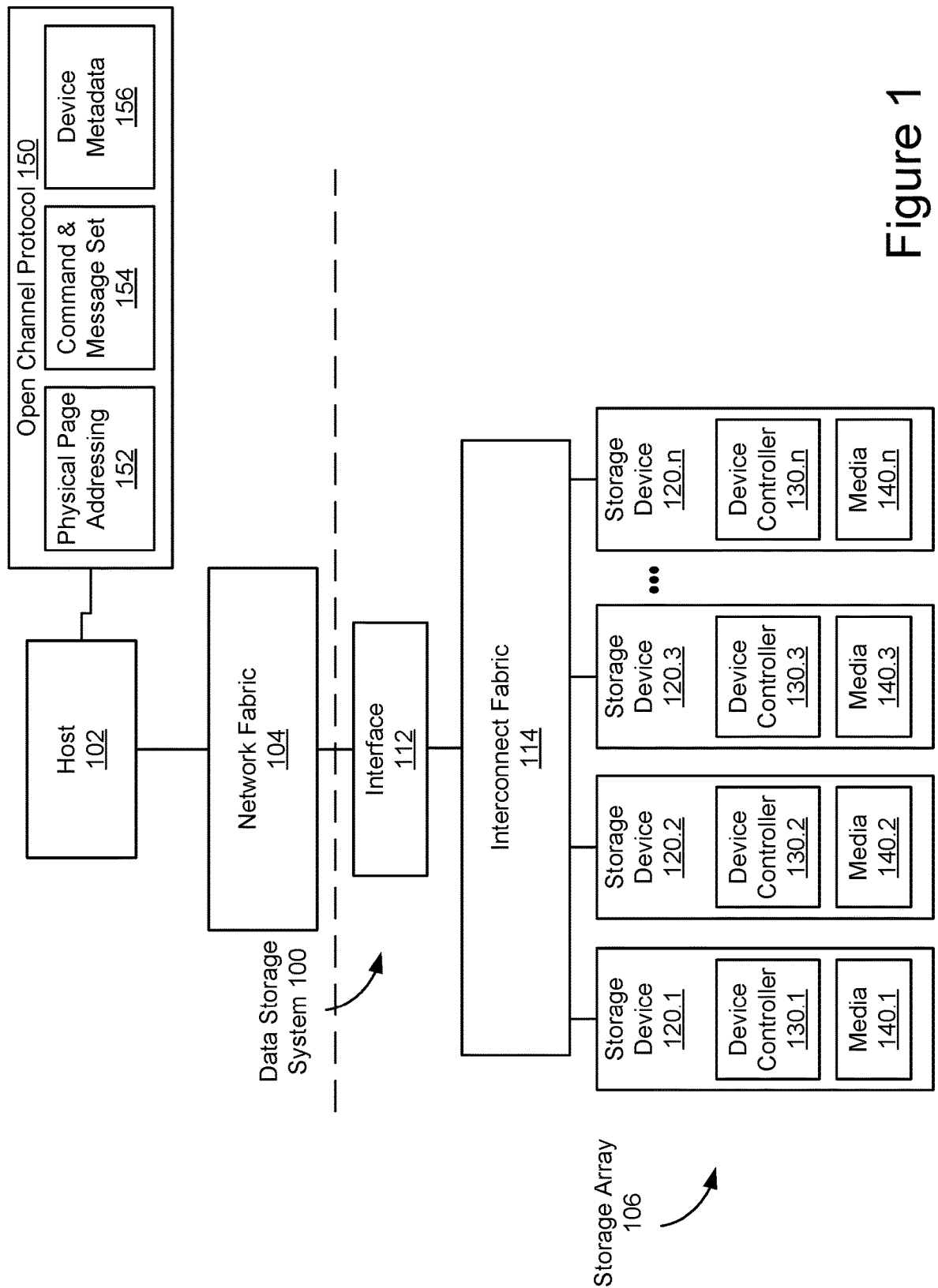
FIG. 1 schematically illustrates an example of a data storage system.

FIG. 1 shows an embodiment of an example data storage system 100 with data storage devices 120. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or disk drives) configured in a storage array 106.

In the configuration shown, storage devices 120 may be configured as open channel solid state drives (OCSSDs). For example, OCSSDs may be storage devices compliant with proprietary or open source Open-Channel standards for SSDs, without an onboard flash translation layer (FTL) for logical-to-physical mapping within each storage device 120. Host 102 may be configured according to open channel protocol 150 to enable host management of input/output (IO) to storage devices 120 and related FTL metadata and processes.

Open channel protocol 150 may include physical page addressing (PPA) 152, command and message set 154, and device metadata 156. PPA 152 may enable host 102 to address physical locations within storage media 140 of storage devices 120 according to their physical geometry. For example, storage devices 120 may expose dies, channels, parallel units (which may correspond to logical unit numbers or LUNs), planes, blocks, and pages for addressing of physical locations within storage media 140.

Command and message set 154 may include the host read, write, and control commands accepted by storage devices 120 and the messages that may be provided by storage devices 120 in response to those host commands. In some embodiments, command and message set 154 may include commands for querying parameters of storage devices 120, in addition to read/write/erase or I/O operations, such as querying channel, timing, error correction code, and other configuration settings or features. Open channel protocol 150 may include proprietary extensions to standardized command and message sets, such as vendor unique commands (VUCs) defined within open channel protocol 150 for handling specific features and configurations of storage devices 120, such as special commands and event notification messages.

Device metadata 156 may include FTL mapping data and other metadata for managing logical-to-physical, garbage collection, and similar management of storage medium devices 140. For example, device metadata 156 may include FTL tables for mapping logical block addresses (LBAs) to PPAs, lists of free and in-use blocks, flash characteristics for specific devices and related physical locations, translation and reverse mapping tables, indicators for status, progress, and relationships supporting garbage collection, media scans, caching, recovery configurations (e.g. RAID), etc. Device metadata 156 may include RAID configurations for data written across media devices, such as dies, within storage devices 120, such as RAID group definitions and the allocation of RAID stripes and related chunk PPAs.

In the embodiment shown, storage array 106 includes a number of storage devices 120 attached to a common interconnect fabric 114. For example, storage array 106 may include a number of disk drives arranged in a storage array, such as storage devices sharing a common rack or unit in a data center. In some embodiments, storage array 106 may share back plane connectivity, network switch(es), and/or other hardware and software components related to interconnect fabric 114. In some embodiments, peer groups may not be collocated in the same unit, rack, data center, or geography. For example, interconnect fabric 114, network interface 112, and network fabric 104 may enable communication among storage devices over any distance and storage arrays may be established regardless (or even because of) different geographic locations, data centers, administrators, and organizations.

In some embodiments, the data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with interconnect fabric 114.

In some embodiments, a respective data storage device 120 may include a single medium device 140 while in other embodiments the respective data storage device 120 includes a plurality of media devices. In some embodiments, media devices include NAND-type flash memory or NOR-type flash memory. In some embodiments, data storage device 120 may include one or more hard disk drives (HDDs) in addition to flash-type storage media. In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In the configuration shown, host 102 may include one or more functions of a storage controller integrated or in communication with open channel protocol 150 for interacting with storage devices 120. For example, the functions of a controller system, a main controller system, a non-volatile memory express (NVMe) controller, garbage collection (GC) leader, or storage virtualization controller (SVC) may be implemented at host 102 or in communication with host 102.

In some embodiments, host 102 is coupled to data storage system 100 through network interface 112 over a network fabric 104. In some embodiments, multiple hosts 102 (only one of which is shown in FIG. 1) are coupled to data storage system 100 through network interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from the plurality of storage devices 120, but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with host 102 in accordance with open channel protocol 150 and through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on media devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in host 102 in accordance with open channel protocol 150. Media segments may include physical storage locations on media devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Write groups may include groups of files configured to be written together (in terms of logical consistency, not physical location) and including at least one data dependency that makes completion of the entire write group important for data consistency and/or recovery. For example, within a RAID configuration, a RAID stripe may be treated as a write group because completion of all chunks within the write group may be a requirement of the desired level of redundancy and/or parity protection. Completion of a write group may be required for data recovery in the event that unrecoverable ECC errors occur (up to an acceptable recovery tolerance of the recovery configuration). Incomplete write groups are those write groups where not all chunks have been successfully written to non-volatile memory, such as their destination PPA in storage media 140.

Figure 2:
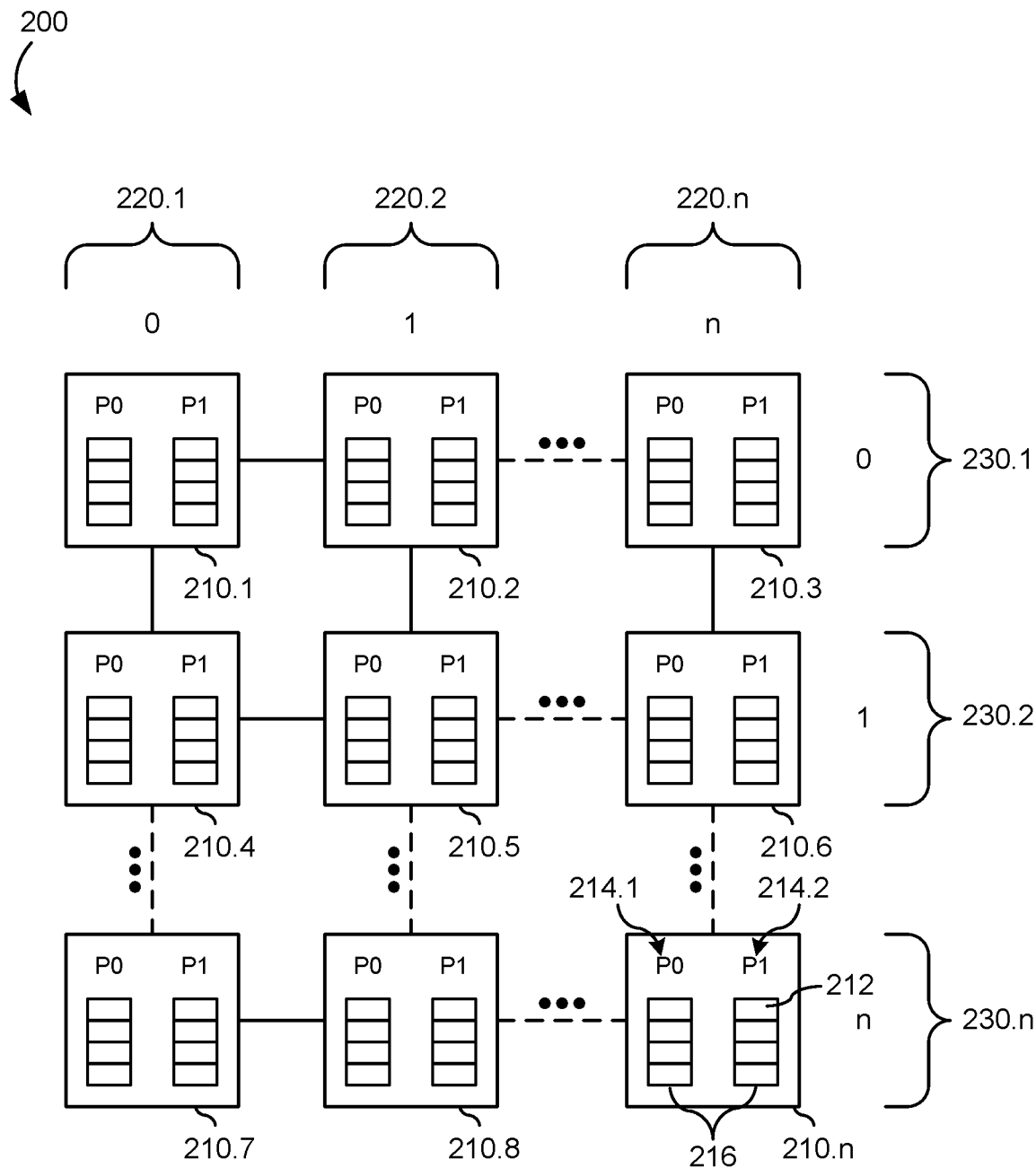
FIG. 2 schematically illustrates an example physical storage location configuration for a solid state drive.

FIG. 2 shows an example storage medium device 200, such storage media 140 in FIG. 1 or a storage media package therein. Storage medium device 200 may include storage dies 210.1-210.*n*, such as flash storage dies. Each of storage dies 210.1-210.*n* may have a die capacity and set of bit-level storage locations grouped in pages or a similar addressable units. While nine storage dies 210 are shown in FIG. 2, any reasonable number of storage dies may be included in storage medium device 200, as defined by size, geometry, process, and control constraints of the underlying storage media technology.

As shown with reference to storage die 210.*n*, each storage die 210 may include multiple planes 214, such as 0-plane 214.1 and 1-plane 214.2. Each plane 214 may include a plurality of blocks, such as block 212. A pair of blocks across planes 214 may be a chunk, such as chunk 216. Chunk 216 and other chunks in storage dies 210 may include a plurality of physical and logical block locations corresponding to a specific set of bit locations within the target chunk based on the block size and starting location. Each such location within the target chunk may be associated with one or more logical block addresses (generally maintained by host FTL in OCSSD). In some embodiments, chunks may correspond to erase blocks for read/write purposes.

Storage dies 210 may be configured in channels 220.1-220.*n*, sometimes referred to as groups, with sequentially numbered parallel units 230.1-230.*n* corresponding to the dies 210 in each channel 220. A PPA may use numeric designations of these physical structures to identify individual storage locations. For example, PPAs may be formatted as: [GroupIdentifier:ParallelUnitIdentifier:ChunkIdentifierl:LogicalBlockIdentifier] In some embodiments, the host may use PPAs in the above format to encode LBAs in NVMe write commands and other I/O commands.

Figure 3:
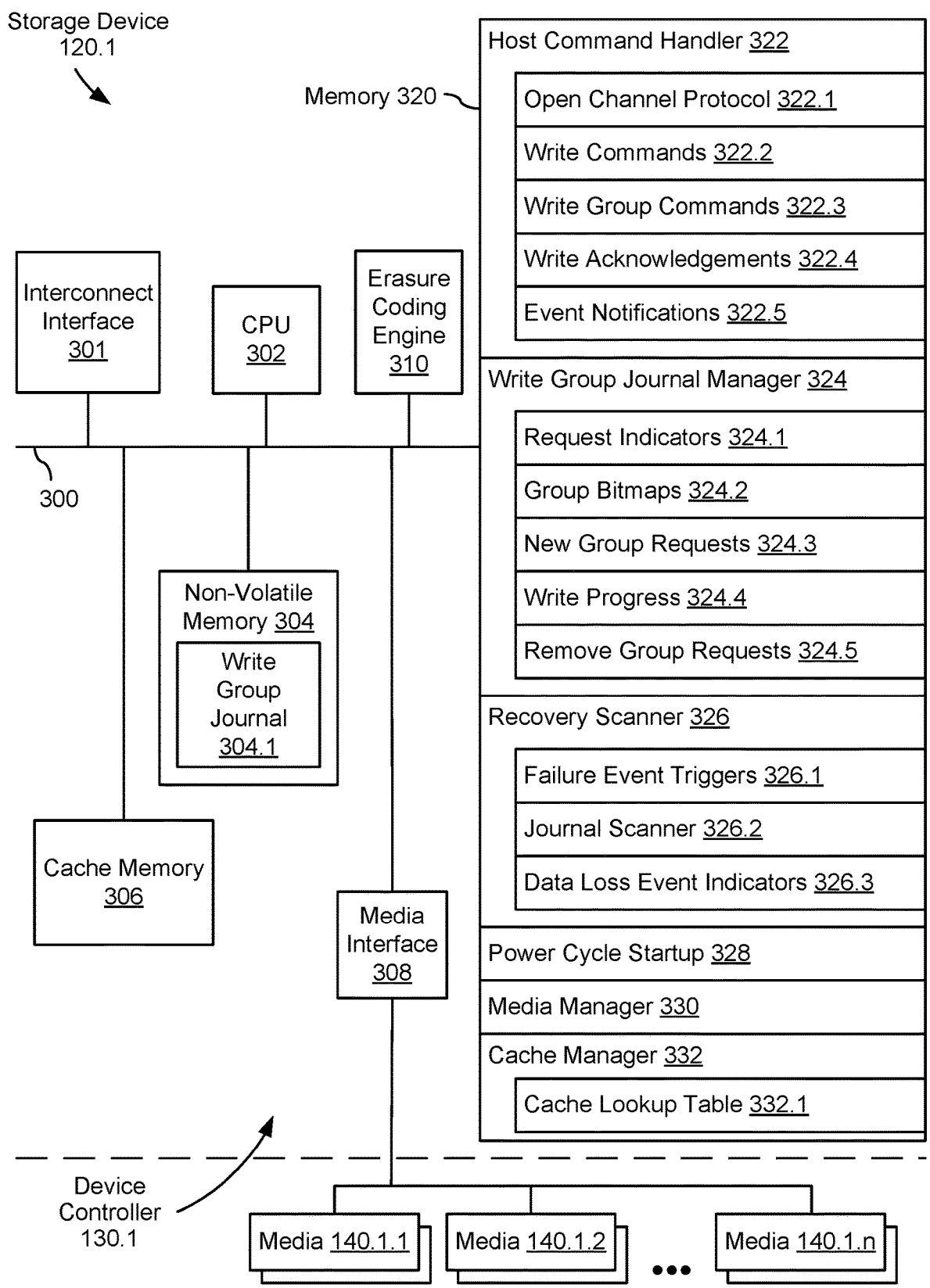
FIG. 3 schematically illustrates an example of a storage device of the data storage system of FIG. 1.

In some embodiments, as shown in FIG. 3, a storage device 120.1 includes the functions of a device controller 130.1 using compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, non-volatile memory 304, cache memory 306, media interface 308, erasure coding (EC) engine 310, and any number of additional modules, such as error correction engines, specialized memory modules, etc., in order to coordinate the operation of these components. In some embodiments, the components of storage device 120.1 may be interconnected by one or more communication buses 300. In some embodiments, CPU 302, memory 320, non-volatile memory 304, cache memory 306, media interface 308, erasure coding engine 310, and any number of additional modules may be packaged as a device controller 130.1, such as an NVM controller, implemented in an application-specific integrated circuit (ASIC), system on a chip (SoC), field programmable gate array (FPGA), or similar architecture.

In some embodiments, storage device 120.1 may be packaged in a housing, such as a sealed, multipart disk drive housing. For example, device controller 130.1 and media devices 140.1 may be enclosed in the housing. In some embodiments, the housing may have an exterior surface surrounding the internal components, with one or more connectors projecting from or interface ports recessed into the exterior surface. For example, these connectors and/or interface ports may provide physical interconnects for power to and communication with storage device 120.1.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of media controller 130.1), non-volatile memory 304, cache memory 306, and other specialized memory (not shown). In some embodiments, storage media, such as media devices 140, may provide local memory resources for data management functions, but these may be distinct from storage locations for host data and/or include temporary storage locations (e.g. cache memory 306) for managing host data during I/O, garbage collection, and other management functions. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or a remote direct memory access (RDMA) interface (not shown), may also include or utilize memory and/or compute resources and may be part of the available local resources of storage device 120.1.

In some embodiments, erasure coding engine 310 may be a hardware, software, or combined hardware/software engine for providing exclusive-or calculations or implementing another erasure coding operation. Erasure coding engine 310 may support multiple functions stored in memory 320 and/or support exclusive-or (XOR) or other erasure code processing of data being transferred to or from non-volatile memory 304, cache memory 306, and/or storage media 140.1. In some embodiments, erasure coding engine 310 may be used to process recovery data, such as paired XOR data and parity data, to calculate the data content of a failed or corrupted data unit.

Additional modules (not shown) supporting one or more functions of storage device 120 may be connected to CPU 302, non-volatile memory 304, cache memory 306, media interface 308, erasure coding engine 310, and memory 320. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by host 102 or a related application, host 102 may send a write command suitable for execution by a data storage device 120 to one or more data storage devices corresponding to one more addresses specified by the write command, a destination storage device.

In some storage systems, host 102 may also send, via network fabric 104, host data to be stored in the one or more data storage devices corresponding to the one more addresses specified by the write command. A respective data storage device receives the data to be stored in its media devices 140.1.1-140.1.*n*, or a portion of the data to be stored, from host 102 via the interconnect fabric 114. The data received by the storage device may be encoded or otherwise processed and made available to storage media interface 308, which transfers the data to media devices 140.1 in a manner dependent on the type of storage medium being utilized. For example, a PPA may be used to identify the storage location for one or more write operations to the storage dies of media devices 140.1 and host data temporarily written to cache memory 306 may be stored to the corresponding storage location.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis). In OCSSD devices, the host may be configured to define these reading and programming parameters.

In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

In addition, these various memory cell configurations and encoding formats may impact the lifetime performance of storage device 120.1. Flash memory may have defined I/O performance, endurance, write voltage thresholds, error rates, cell/device failures, and other parameters that may be tracked for specific performance values and/or contributions to storage capacity, performance class, endurance, and/or overall health. Similarly, cell usage, read and write load balancing, garbage collection, and other operations may be tracked for endurance, reliability, and failure prediction for media devices 140.

In OCSSD configurations, for example, host 102 may manage some or all of these parameters and functions to align with application-specific performance criteria. In some embodiments, host 102 may implement a data recovery scheme, such as RAID or RAID-like configurations across parallel units or dies in storage media 140. For example, host 102 may store host data in RAID stripes configured across chunks in different channels, including both original and parity data. In some configurations, some host data may be configured in RAID stripes and some host data may be configured without RAID stripes, depending on application, configuration, and data recovery concerns. RAID configurations may include parity-based configurations like RAID 5, RAID 6, or RAID 10, or simple mirroring (RAID 1).

FIG. 3 is a block diagram illustrating example functions and data structures instantiated in storage device 120.1 for identifying and managing incomplete write groups, in accordance with some embodiments. Storage device 120.1 includes CPU 302 (for executing modules, programs, and/or instructions stored in memory 320 and thereby performing processing operations), memory 320 (sometimes called NVM controller memory, device controller memory, or operating memory), and one or more communication buses 300 for interconnecting these components.

The one or more communication buses 300 optionally include circuitry (sometimes called a chipset) that interconnects and controls communications between system components. CPU 302 and memory 320 may be coupled to interconnect fabric interface 301, non-volatile memory 304, cache memory 306, media interface 308, erasure coding engine 310, media devices 140.1, and any additional module(s) by the one or more communication buses 300. In some embodiments, interface hardware and/or protocols for providing communication through communication buses 300 may also be present for communication with any given component.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as cache memory 306 for temporary storage of I/O host data, and/or non-volatile memory 304 for storing the write group journal and parameters/settings used in response to drive startup or a drive power cycle event. These functional memories may include specialized processing, hardware acceleration, and/or other resources related to their function. In some embodiments, cache memory 306 and/or non-volatile memory 304 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:

- host command handler 322 for managing commands and messages exchanged with host 102;
- write group journal manager 324 for monitoring write group requests using write group journal 304.1 in non-volatile memory 304;
- recovery scanner 326 for scanning write group journal 304.1 in response to a possible failure event, such as a power cycle;
- power cycle startup 328 for restarting operations in storage device 120.1 in response to power loss, reset, and similar events;
- media device manager 330 for managing storage media I/O processes and requests, such as media read and write operations through media interface 308 to media devices 140.1.1-140.1.$n$;
- cache manager 332 for manage cache memory I/O processes and requests, such as cache read and write operations to cache memory 306.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

In some embodiments, host command handler 322 may provide message handling, processing logic, and/or data structures for communication with a host or other storage controller. For example, host 102 may communicate with host command handler 322 using open channel protocols and PPA-based I/O commands. In some embodiments, host command handler 322 may be configured to support a variety if read/write/erase I/O commands, as well as other commands for identifying, configuring, and managing storage device 120.1 and its resources.

Host command handler 322 may include a plurality of modules that support one or more group write commands, such as commands to identify a group of related writes, such as a RAID stripe, mirrored writes, write blocks for an oversized data object or data structure, etc. For example, host command handler 322 may be configured to include open channel protocol 322.1, write commands 322.2, write group commands 322.3, write acknowledgements 322.4, and event notifications 322.5.

Open channel protocol 322.1 may define a host command set for storage operations. In some configurations, the host command set may include a set of standard read, write, and erase commands, as well as their accompanying syntax and parameters. Host command handler 322 may implement command validators and parsers capable of receiving host commands, identifying a command type, validating any accompanying parameters, arguments, or data in accordance with open channel protocol 322.1, and forwarding the corresponding storage operations to the relevant execution resource. In some embodiments, open channel protocol 322.1 may include support for custom commands, such as vendor specific commands (VSCs), in addition to a standard command set. Open channel protocol 322.1 may also include support for fused commands, where two or more commands, including two different command types, may be combined in a single command transaction.

Write commands 322.2 may instantiate a standard host write command protocol specifying a storage location and host data to be written into that storage location. For example, an NVMe write command may include a PPA parameter for storage location and host data payload or source location. Write commands 322.2 may support additional features or parameters. In some embodiments, the host data in write commands 322.2 may initially be written to cache memory 306, regardless of target PPA, and then transferred in accordance with the availability of media device manager 330 and related resource and/or other persistence criteria.

Write group commands 322.3 may be an administrative command to identify the members of a related write group and denote the start of a write group. For example, write group commands 322.3 may be write group start commands including a series of PPAs corresponding to related write data blocks, such as the data and parity chunks of a RAID stripe. The series of PPAs may indicate a set of current and/or future write commands that will be received in accordance with write commands 322.2. Write group commands 322.3 may designate a set of write commands that need to all be completed to provide coherence and/or meet data security and/or recovery parameters for the host. In some embodiments, the write group commands 322.3 may be fused with a first write command in the set of write commands 322.2 for the related write group.

Write acknowledgements 322.4 may send one or more acknowledgement messages in response to commands received from and/or complete for the host. For example, write acknowledgements 322.4 may be sent responsive to host data for a write command being successfully received by storage device 120.1. Receiving the host data may include storing the host data and related metadata in cache memory 306 and may not require persistent storage in storage media 140.1 before write acknowledgement 322.4 is sent. In some embodiments, write acknowledgements 322.4 may be defined by open channel protocol 322.1.

Event notifications 322.5 may send one or more notification messages to the host in response to events or conditions within storage device 120.1. For example, event notifications 322.5 may be sent to the host responsive to a power cycle event or an error condition related to storage device 120.1. Event notifications 322.5 may include parameters, such as error codes or error messages, to communicate on or more details of the event conditions the event notification is responding to. In some embodiments, event notifications 322.5 may include an incomplete write group notification. For example, in response to recovering scanner 326 determining that a related write group is incomplete following a failure event, event notifications 322.5 may be sent identifying the incomplete write group, such as by including the PPAs of the write group, a group identifier assigned to the write group, and/or the PPA of the missing write blocks or write commands within the write group.

Write group journal manager 324 may include a plurality of modules that support monitoring group write commands, such as commands to identify a group of related writes, and related persistent writes to PPA storage locations in storage media 140.1. For example, write group journal manager 324 may be configured to include request indicators 324.1, group bitmaps 324.2, new group requests 324.3, write progress 324.4, and remove group requests 324.5 for managing write group journal 304.1.

Write group journal 304.1 may be configured to store request indicators 324.1 for each related write group identified in write group command 322.3. For example, each request indicator may be configured as a group bitmap 324.2 identifying the PPAs of the related write group. In some embodiments, request indicators 324.1 may be configured as one or more registers, tables, databases, or other data structures for maintaining a list of related write groups and their completion status. For example, request indicators 324.1 may be configured as a group identifier associated with a status value, such as complete or incomplete. In some embodiments, only active request indicators 324.1 may be included in write group journal 304.1, such that any write group in the journal may be considered incomplete and request indicators 324.1 are removed upon completion of the related write group.

In some embodiments, group bitmaps 324.2 and their presence in write group journal 304.1 may act as request indicators 324.1. For example, in some configurations, a series of bitmaps for the active and incomplete write group requests may be the complete contents of write group journal 304.1 and sufficient for the functions of write group journal manager 324 and recovery scanner 326. Group bitmaps 324.2 may be bitmaps of the dies, parallel units, or another set of physical locations the write group will span or be written to. For each write data block in the write group, group bitmaps 324.2 may track when the group write request is opened, when the host data for each write is received by storage device 120.1 (for example, in cache memory 306), when each write is acknowledged to the host, and when each write is written to persistent storage in storage devices 140.1.

In some embodiments, write group journal 304.1 may be structured with request indicators 324.1 and group bitmaps 342 in a series of entries that include a persistent journal header and non-persistent journal data. For example, for each entry, the journal header may include a logical group number (e.g. RAID group), stripe/page number, and the group bitmap for the logical group. The journal data may include a series or range of PPAs, corresponding buffer addresses, and write status information.

New group requests 324.2 may be a function for creating a new request indicator 324.1 and/or group bitmap 324.2 in response to new write group commands 322.3. For example, new group request 324.2 may receive or parse write group commands 322.3, determine the initial contents of the new write group entry for write group journal 304.1, and generate the corresponding write group entry, including request indicators 324.1 and/or group bitmaps 324.2. New group requests 324.2 may include or access a write interface for non-volatile memory 304 to store request indicators 324.1 and/or group bitmaps 324.2.

Write progress 324.4 may be a function for updating request indicators 324.1 and/or group bitmaps 324.2 in response to host write data being received by storage device 120.1, related write acknowledgements 322.4 being sent, and/or host write data being moved or written into persistent storage in media devices 140.1. For example, request indicators 324.1 and/or group bitmaps 324.2 may include one or more status indicators, such as flags, status codes, or other parameter values, for each write request and/or storage location (e.g. PPA) in the related write group and change the status indicator (selectively or by overwriting the entire entry) in response to one or more of the changes. In some embodiments, write progress 324.4 may also update request indicators 324.1 and/or group bitmaps 324.2 to indicate that the write group is complete in response to all related writes being stored to media devices 140.1, rather than relying on remove group requests 324.5 to remove complete write group entries.

Remove group requests 324.5 may be a function for removing request indicators 324.1 and/or group bitmaps 324.2 in response to all host data in the related write group being stored to persistent storage in storage media 140.1. For example, upon completion of moving all write data blocks from cache memory 306 to the target storage locations for the write data block PPAs in storage media 140.1, remove group requests 324.5 may remove request indicators 324.1 and/or group bitmaps 324.2 from write group journal 304.1. In some embodiments, this may both free up space in non-volatile memory 304 and act as a completion indicator for recovery scanner 326, since only incomplete related write groups would remain in write group journal 304.1. In some embodiments, remove group requests 324.5 may not be immediately responsive to the completion of the last write to persistent storage. Request indicators 324.1 and/or group bitmaps 324.2 that are indicated as complete by write progress 324.4 may be removed through a subsequent housecleaning or entry removal scan of write group journal 304.1.

Recovery scanner 326 may include a plurality of modules that support using write group journal 304.1 to identify incomplete write groups in response to unexpected interruptions of the write process, such power cycle events. Recovery scanner 326 may also provide a trigger for appropriate event notifications 322.5 to be sent to the host if recovery scanner 326 detects possible data loss events. Recovery scanner 326 may be configured to include failure event triggers 326.1, journal scanner 326.2, and data loss event indicators 326.3.

Failure event triggers 326.1 may include one or more trigger conditions for recovery scanner 326. For example, recovery scanner 326 may be triggered as part of a startup or restart process, such as power cycle startup 328, when storage device 120.1 restarts from a power loss, shut down, and/or restart. In some embodiments, failure event triggers 326.1 may include other trigger conditions, such as internal errors that interrupt read/write I/O processing and/or could result in the loss of data in cache memory 306 prior to storage in persistent memory.

Journal scanner 326.2 may include one or more functions for reading entries in write group journal 304.1, such as request indicators 324.1 and/or group bitmaps 324.2, and determining whether any incomplete write groups are identified. For example, each entry in write group journal 304.1 may correlate to a write group that has not yet been indicated as completed by write group journal manager 324 and the write groups corresponding to each entry may be determined to be incomplete, or at least considered at risk of being incomplete without subsequent data verification or similar additional processing. Journal scanner 326.2 may identify the presence of one or more incomplete write groups in write group journal 304.1. Journal scanner 326.2 may identify write group indicators, such as an assigned write group identifier, the series of PPAs corresponding to the write group, or some other value associated with the write group, for each incomplete write group and/or identify specific write blocks, PPAs, or other data units within incomplete write groups that were not completed.

Data loss event indicators 326.3 may include one or more resulting indicators for incomplete writes in response to a failure event and may serve as a message or trigger for event notifications 322.5. For example, if journal scanner 326.2 identifies one or more incomplete writes, one or more data loss event indicators 326.3 may be generated and communicated to event notifications 322.5. In some embodiments, data loss event indicators 326.3 may include one or more parameters identifying the incomplete write group or write groups. Data loss event indicators 326.3 may also indicate other event parameters, such as a time, cause (if known), etc. for the failure event that triggered the loss and/or the specific write blocks and/or PPAs that were not completed.

Power cycle startup 328 may include one or more device controller modules for managing power up and related startup operations for storage device 120.1. Power cycle startup 328 may include the sequence of system events used to return storage device 120.1 from an off or powered down state back to an operational state for data storage I/O and management. Power cycle startup 328 may include configuration parameters, such as a configuration file or register, that enables various system checks upon startup. A call or trigger for journal scanner 326.2 may be included in power cycle startup 328 for power loss and/or startup failure event triggers 326.1, such that journal scanner 326.2 is run at startup after every power cycle event and/or every unplanned power cycle event. A power cycle event may identify an event time at which power was lost (power loss time) and/or power was restored (restart time).

Media manager 330 manages access to and maintenance of media devices 140.1. In some embodiments, storage device 120.1 may be configured in accordance with OCSSD protocols and some parameters and tasks of media manager 330 may be handled at the host level. For example, media manager 330 may include some base FTL services for storage device 120.1 to manage bad blocks, read/write media device access parameters, and other media-specific features and characteristics, as well as managing read, write, and data management access to media devices 140.1. In some embodiments, media manager 330 may expose various features and parameters to the host and receive configuration settings and select FTL metadata for managing the performance of media devices 140.1. Host commands involving host data reads, writes, erases, etc. may be directed by media manager 330 through media interface 308 for accessing media devices 140.1. In some embodiments, host data commands may be pre-processed by other modules, such as host command handler 322 and cache manager 332, and related internal data access commands may be received by media manager 330.

Media manager 330 may be responsible for bad block management, bad block spare overprovisioning, and allocation of gap free logical space throughout the life of the media devices 140.1. In OCSSD configurations, media manager 330 may interact with a host for some or all of these functions. In some embodiments, media manager 330 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). Media manager 330 may enable reads from PPA storage locations in media devices 140.1 to write in cache memory 306 and reads from cache memory 306 to writes in PPA storage locations in media devices 140.1.

Cache manager 332 manages access to and maintenance of cache memory 306. Cache manager 332 may include or access cache allocation mapping information, such as a cache allocation table, and may include logic for determining what I/O operations are executed through cache memory 306. In some embodiments, cache manager 332 may include logic for organizing write blocks in cache memory 306, which may include grouping write block in related write groups. Cache manager 332 may include logic for determining when write blocks stored in cache memory 306 are written to persistent storage in media devices 140. For example, cache manager 332 may use completion of a write group in cache memory 306 as a trigger to queue the associated writes into media devices 140.1.

In some embodiments, cache manager 332 may also enable verification of what data is present in cache. For example, a cache lookup table 332.1 may be provided and may include an interface or service for querying whether a given data block, such as a RAID chunk, is present in cache. To check the presence of a logical data block in the cache, a lookup may be performed in the cache lookup table based on the PPA of the logical data block of interest. For example, cache lookup table 332.1 may be searched for the selected PPA and, if no entries including that PPA are found, the logical data block is not in cache.

As shown in FIGS. 4A-4D, storage device 400 may operate within a data storage system to monitor related write groups using journal 430. FIGS. 4A-4D may represent a series of operating stages in time for the handling of two example group write requests for related writes distributed across dies 450, 460, 470, 480. For example, each write group may represent a RAID stripe comprised of three original data chunks and one parity data chunk. Storage device 400 may initially receive host data in cache 410 before storing it in the target PPA storage locations in dies 450, 460, 470, 480.

Figure 4A:
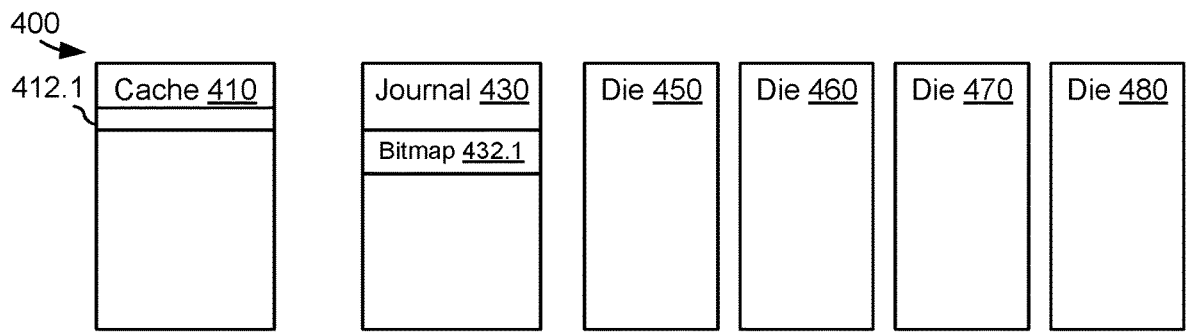
FIGS. 4A-4D illustrate an example use of a write group journal for a storage device.

In FIG. 4A, a first write group request may be received by storage device 400 identifying four write operations to PPAs on dies 450, 460, 470, 480. In response to the write group request, a new entry has been added to journal 430 as bitmap 432.1. In the example shown, the write group request may have been fused to the first write command for the write group, so host data block 412.1, addressed to a PPA in die 450, has been stored in cache 410.

Figure 4B:
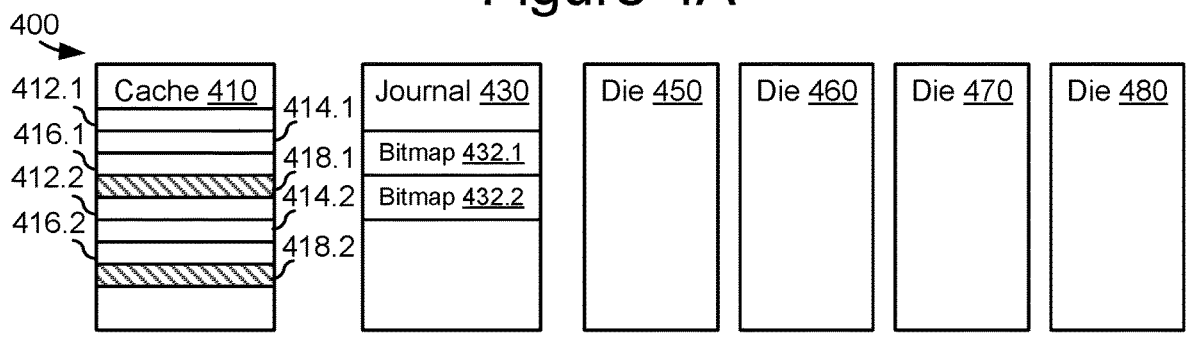

In FIG. 4B, the remaining write commands in the first write group have been received and host data blocks 414.1, 416.1, and 418.1 have been added to cache 410. Additionally, a second write group request may have been received by storage device 400, again identifying four write operations to PPAs on dies 450, 460, 470, 480. Another new entry has been added to journal 430 as bitmap 432.2. All host data blocks 412.2, 414.2, 416.2, and 418.2 have also been received in their respective write commands and stored in cache 410. In some embodiments, write acknowledgements for the write commands corresponding to host data blocks 412.1, 414.1, 416.1, and 418.1 in the first related write group and host data blocks 412.2, 414.2, 416.2, and 418.2 in the second related write group may have been sent to the host, even though no host data has been written to dies 450, 460, 470, 480. Storage of the data blocks in cache 410 and/or sending of the acknowledgements may be represented in the corresponding bitmaps 432.1 and 432.2. In the event of a power failure at this point, both the first and second write groups could be identified from journal 430 as incomplete.

Figure 4C:
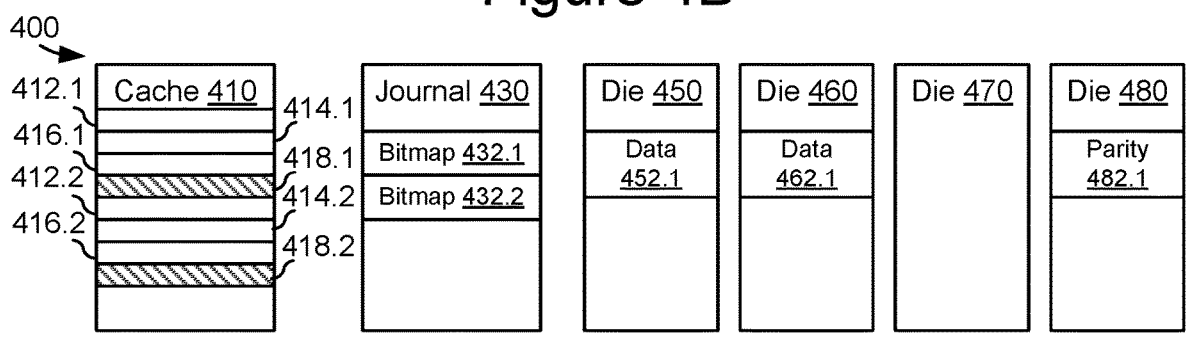

In FIG. 4C, host data blocks 412.1, 414.1, and 418.1 have been written to PPAs on dies 450, 460, 480 as data blocks 452.1, 462.1, and 482.1. Because the write group is incomplete, bitmap 432.1 may be updated to reflect the host data blocks stored in persistent memory, but does not indicate that the related write group has been completed and has not been removed. In the event of a power failure at this point, both the first and second write groups could still be identified from journal 430 as incomplete.

Figure 4D:
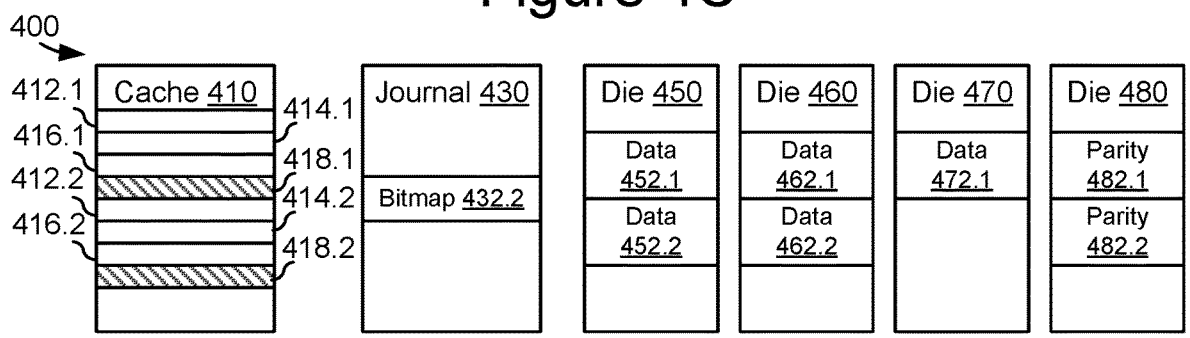

In FIG. 4D, host data block 416.1 has been written to die 470 as data block 472.1. This completes the first related write group and, therefore, bitmap 432.1 has been removed from journal 430. Host data blocks 412.2, 414.2, and 418.2 have been written to PPAs on dies 450, 460, 480 as data blocks 452.2, 462.2, and 482.2. Because the second write group is still incomplete, bitmap 432.2 may be updated to reflect the host data blocks stored in persistent memory, but does not indicate that the related write group has been completed and has not been removed. In the event of a power failure at this point, both only the second write group could still be identified from journal 430 as incomplete. Note that storage device 400 may not clear cache 410 based solely on the completion of the write group in persistent storage and host data blocks 412.1, 414.1, 416.1, and 418.1 may remain in cache 410 until the cache space is needed for another purpose.

Figure 5:
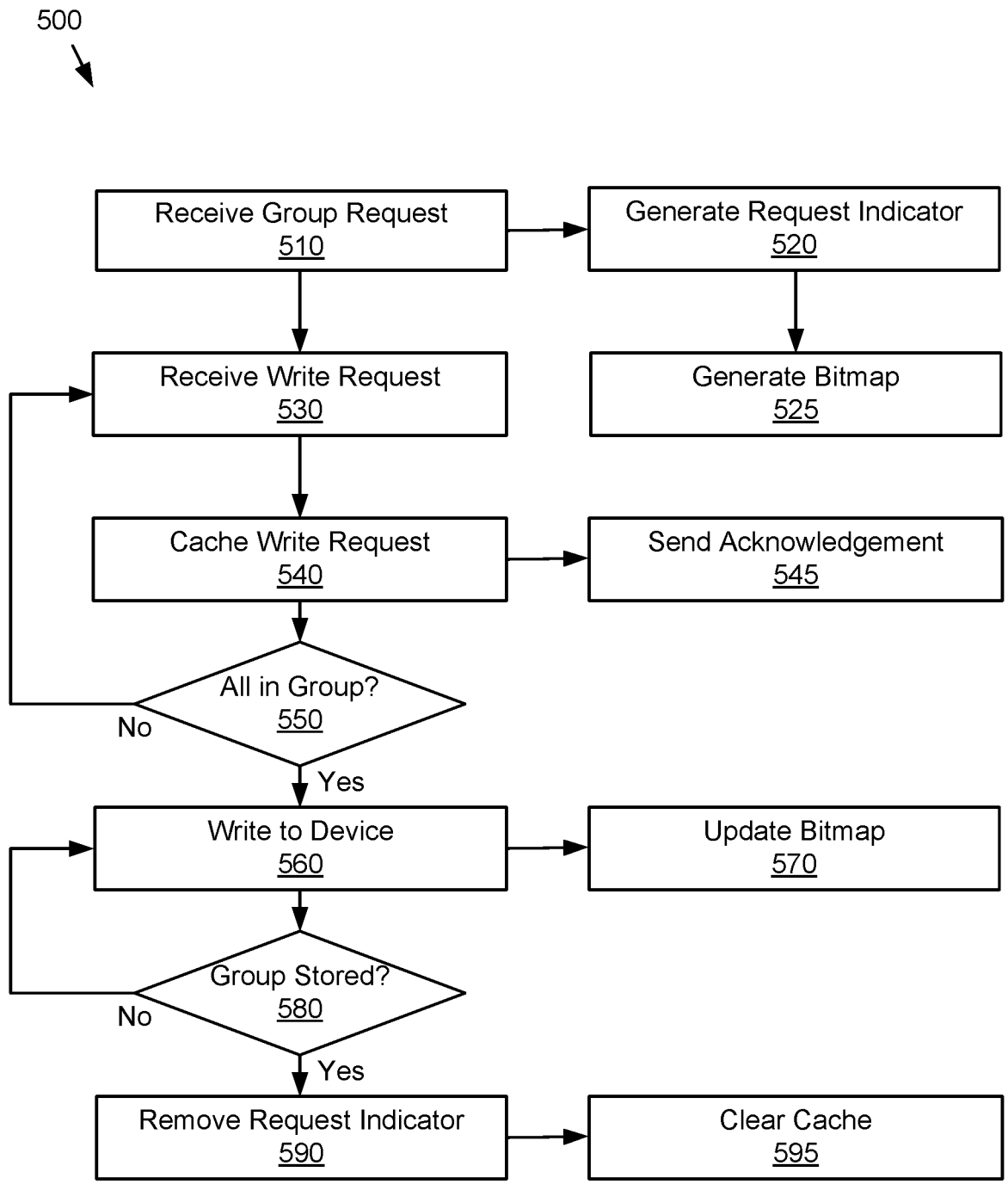
FIG. 5 illustrates an example of a method for managing a write group journal in a storage device.

As shown in FIG. 5, storage device 120.1 operating within data storage system 100 may be operated in response to host 102 to monitor write group completion. For example, storage device 120.1 may receive use a write group journal to provide a persistent record of incomplete write groups according to the method 500 illustrated by blocks 510-595 of FIG. 5.

At block 510, a group request may be received, such as a related write group request. For example, a write group request command identifying a plurality of related writes according to their PPA may be received by a storage device.

At block 520, a request indicator may be generated corresponding to the received group request. For example, a request indicator identifying the PPAs in the write group and their status may be written to a write group journal in persistent memory.

At block 525, a bitmap may be generated corresponding to the request indicator generated at block 520. For example, the bitmap may map the target PPAs for the write group and status information corresponding to each PPA and/or related write command. The bitmap may be stored in the write group journal.

At block 530, a write request or command may be received corresponding to the write group in the group request received at block 510. For example, one of the target PPAs and corresponding host data and related metadata may be received. In some embodiments, the first write request or command may be received with the group request.

At block 540, the write request may be stored in a temporary memory location, such as cache memory. For example, the host data and related metadata, including the destination PPA, may be stored in a write cache in the storage device.

At block 545, an acknowledgement message for the received write request may be sent to the host. For example, an acknowledgement message may be sent in response to each write request processed to confirm receipt of the host data in the storage device. Note that these acknowledgement messages may be sent even though the host data has not been stored to persistent memory.

At block 550, whether or not the related write group is received may be evaluated. If all write requests for the group have been received and stored to cache, then the related write group is received and method 500 may proceed to block 560. If all write requests for the group have not been received, then method 500 may return to block 530 to receive addition write requests in the write group.

At block 560, the host data may be written to the storage media in the storage device. For example, internal writes from cache to media may be queued for each PPA in the related write group.

At block 570, the bitmap may be updated for each PPA in the write group as its status changes from cached to persistent storage. For example, a status indicator for each PPA may be changed to write complete as the writes to the storage media are completed.

At block 580, whether or not the related write group has been stored may be evaluated. If all PPAs in the group have been written to their respect storage locations in the storage media, then the write group is complete and method 500 may proceed to block 590. If all PPAs in the group have not been written to their respective storage locations in the storage media, then the write group is incomplete and method 500 may return to block 560 to continue writing host data blocks for the write request to their PPA storage locations in the storage media.

At block 590, the request indicator may be removed to indicate that the write group status has changed from incomplete to complete. For example, the request indicator and bitmap stored in the write group journal may be removed such that a scan of the write group journal will not find an indication that the write group is incomplete.

Figure 6:
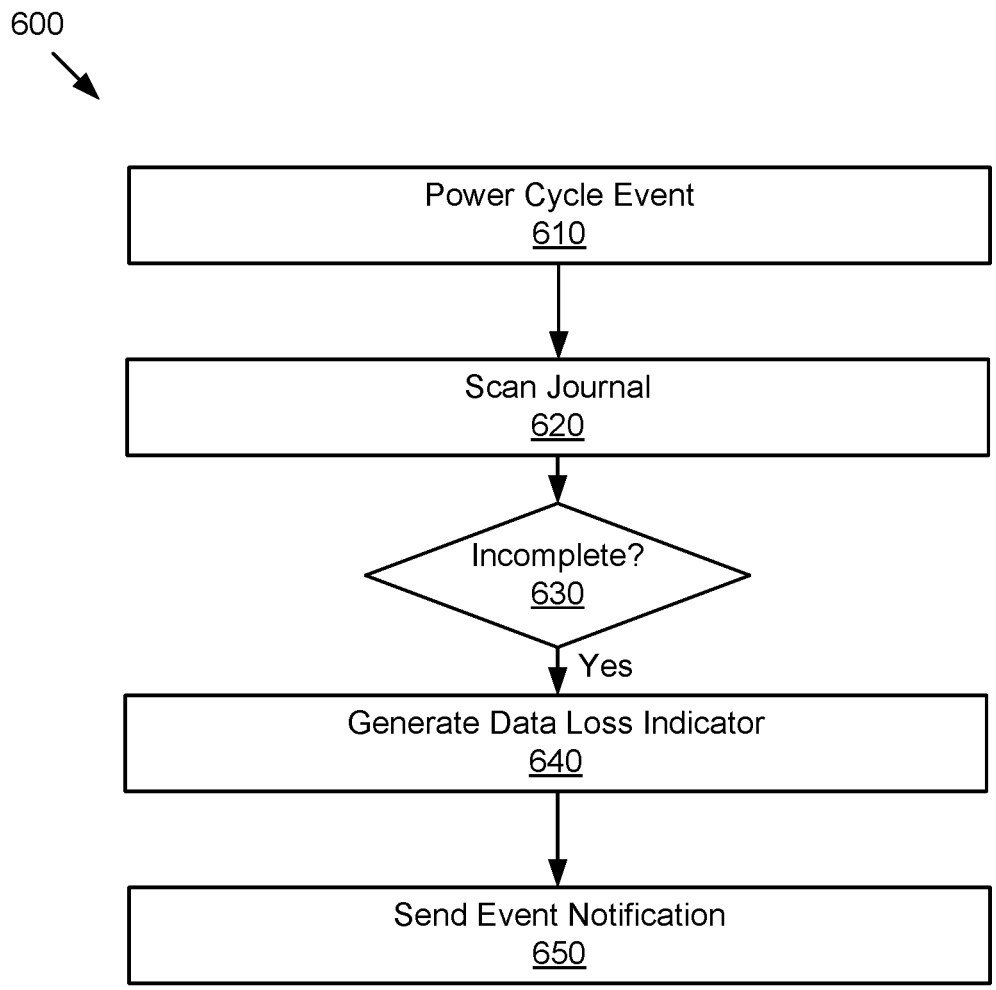
FIG. 6 illustrates an example of a method for notifying a host about an incomplete write group resulting in data loss.

As shown in FIG. 6, storage device 120.1 operating within data storage system 100 may be operated to generate an event notification in response to a power cycle event. For example, storage device 120.1 may generate a write group incomplete event notification based on a scan of the write group journal according to the method 600 illustrated by blocks 610-650 of FIG. 6.

At block 610, a power cycle event may occur. For example, a power interruption to the storage device or related system or rack may cause a sudden loss of power and data in volatile memory, such as some cache memory, and/or data being written to persistent storage but not yet complete. A forced restart or internal error within the storage device may also trigger a power cycle event.

At block 620, in response to the power cycle event, the write group journal may be scanned for entries corresponding to incomplete writes. For example, the storage device may process a number of automated actions on startup, including a scan of the write group journal for incomplete data groups.

At block 630, whether or not any incomplete write groups are recorded in write group journal may be evaluated. If there are entries for incomplete write groups in the write group journal, then method 600 may proceed to block 640. If there are no entries for incomplete write groups in the write journal, than method 600 may conclude or may proceed to block 650 to send a power cycle notification that identifies that no write groups were incomplete at the time of the power cycle event.

At block 640, one or more data loss indicators may be generated for each incomplete write group identified from the journal scan at block 620. For example, a data loss indicator may include a write group identifier and/or the PPAs of the write blocks in the group. In some embodiments, data loss indicators may include only the PPAs that were incomplete at the time of the power cycle event.

At block 650, an event notification may be sent to the host in response to the data loss indicator(s). For example, an event notification for a possible data loss event identifying the write group and/or the specific PPAs in the write group that were not recorded as complete may be sent to the host.

Figure 7:
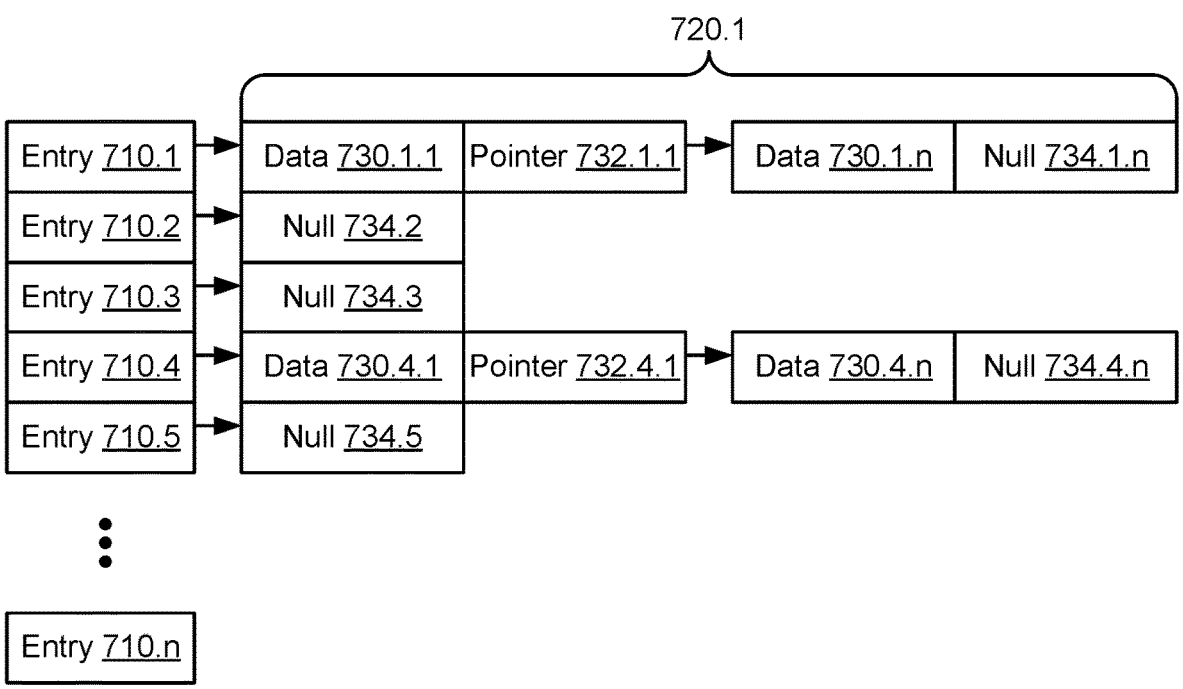
FIG. 7 schematically illustrates an example cache lookup table.

FIG. 7 shows an example cache lookup table 700 for locating logical data blocks, such as RAID chunks. For example, cache lookup table may be implemented as a data structure with a plurality of indexed entries 710. In some embodiments, each entry may correspond to a chunk logical block and table 700 may arrange them in series. Each entry may include mapping data 730 for finding a cache location from a PPA or similar index. In some embodiments, each entry may be structured as a linked list, such as linked list 720.1. For example, each set of mapping data may include a group identifier, a PU or PPA identifier, and a pointer or other reference for a cache address. Each block of mapping data 730 may include a pointer 732, where the pointer indicates the next entry. Where the logical block address is not available in cache, entries 710 may include a null value 734.

To check for the presence of logical data in cache using cache lookup table 700, a lookup may be performed using entries 710. At each entry, there may be a single linked list of entries where each entry will have mapping information for the cached data. If a host data operation calls for a PPA that matches a PPA present in the entry, it may indicate that the data is present in cache and return the pointer to the cache location. If there are no matching entries in the index, it means the read data may not be available in cache.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device, comprising:
    at least one non-volatile storage medium comprised of a plurality of storage locations addressable with physical page addresses;
    a non-volatile journal configured to store a related write request indicator, wherein the related write request indicator is configured to:

identify a related write group that includes a plurality of physical page addresses corresponding to a plurality of write requests; and
indicate whether the related write group has been stored in the plurality of storage locations corresponding to the plurality of physical page addresses; and
a device controller configured to:
process the plurality of write requests to store a plurality of write data blocks corresponding to the related write group to the plurality of physical page addresses in the at least one non-volatile storage medium; and
update, responsive to processing the plurality of write requests, the related write request indicator.

2. The storage device of claim 1, wherein the related write group is a redundant array of independent disks (RAID) stripe.

3. The storage device of claim 1, further comprising:
a cache memory configured to store the plurality of write data blocks corresponding to the related write group prior to writing the plurality of write data blocks to the plurality of physical page addresses; and
a device manager configured to write, responsive to the plurality of write data blocks being stored in the cache memory, the related write group to the plurality of storage locations corresponding to the plurality of physical page addresses.

4. The storage device of claim 3, wherein the cache memory is further configured to store metadata indicating a destination physical page address for each write data block of the plurality of write data blocks stored in the cache memory.

5. The storage device of claim 1, wherein:
the related write request indicator includes a bitmap of the related write group; and
the bitmap indicates which write data blocks of the plurality of write data blocks have been stored in the plurality of storage locations corresponding to the plurality of physical page addresses.

6. The storage device of claim 5, wherein the device controller is further configured to generate, responsive to a related write group request including the plurality of physical page addresses for the related write group, the bitmap of the related write group.

7. The storage device of claim 1, wherein the device controller is further configured to remove, responsive to the plurality of write data blocks corresponding to the related write group being stored in the plurality of storage locations corresponding to the plurality of physical page addresses, the related write request indicator from the non-volatile journal.

8. The storage device of claim 1, wherein the device controller is further configured to:
scan, in response to a drive power cycle, the non-volatile journal for at least one incomplete related write group;
identify an incomplete related write group by the related write request indicator indicating that the related write group has not been stored in the plurality of storage locations corresponding to the plurality of physical page addresses;
generate, in response to identifying at least one incomplete related write group, a data loss event indicator for a data loss event; and
send, responsive to the data loss event indicator, an event notification to at least one host system.

9. The storage device of claim 1, wherein:
the device controller is further configured to receive a write group start command; and
the write group start command includes the plurality of physical page addresses corresponding to the related write group.

10. The storage device of claim 9, wherein the write group start command is fused to a write command for a first write data block in the related write group.

11. A computer-implemented method, comprising:
receiving, in a storage device, a plurality of write requests for a plurality of storage locations addressable with physical page addresses, wherein the plurality of write requests correspond to a related write group;
storing, in a non-volatile journal of the storage device, a related write request indicator, wherein the related write request indicator is configured to:
identify the related write group that includes a plurality of physical page addresses corresponding to the plurality of write requests; and
indicate whether the related write group has been stored in the plurality of storage locations corresponding to the plurality of physical page addresses;
processing, by the storage device, the plurality of write requests to store a plurality of write data blocks corresponding to the related write group to the plurality of physical page addresses in at least one non-volatile storage medium of the storage device; and
updating, responsive to processing the plurality of write requests, the related write request indicator.

12. The computer-implemented method of claim 11, further comprising:
storing, responsive to receiving the plurality of write requests, the plurality of write data blocks for the plurality of write requests in a cache memory of the storage device; and
writing, responsive to the plurality of write data blocks being stored in the cache memory, the related write group to the plurality of storage locations corresponding to the plurality of physical page addresses.

13. The computer-implemented method of claim 12, further comprising:
storing, in the cache memory of the storage device, metadata indicating a destination physical page address for each write data block of the plurality of write data blocks stored.

14. The computer-implemented method of claim 11, further comprising:
storing a bitmap of the related write group in the non-volatile journal, wherein the bitmap indicates which write data blocks of the plurality of write data blocks have been stored in the plurality of storage locations corresponding to the plurality of physical page addresses.

15. The computer-implemented method of claim 14, further comprising:
generating, responsive to a related write group request including the plurality of physical page addresses for the related write group, the bitmap of the related write group.

16. The computer-implemented method of claim 11, further comprising:
removing, in response to completely storing the plurality of write data blocks corresponding to the related write group in the plurality of storage locations corresponding to the plurality of physical page addresses, the related write request indicator from the non-volatile journal.

17. The computer-implemented method of claim 11, further comprising:
  scanning, in response to a drive power cycle, the non-volatile journal for at least one incomplete related write group;
  identifying an incomplete related write group by the related write request indicator indicating that the related write group has not been stored in the plurality of storage locations corresponding to the plurality of physical page addresses;
  generating, in response to identifying at least one incomplete related write group, a data loss event indicator for a data loss event; and
  sending, responsive to the data loss event, an event notification to at least one host system.

18. The computer-implemented method of claim 11, further comprising:
  receiving a write group start command, wherein the write group start command includes the plurality of physical page addresses corresponding to the related write group.

19. The computer-implemented method of claim 18, wherein the write group start command is fused to a first write request from the plurality of write requests corresponding to the related write group.

20. A storage device, comprising:
  a non-volatile storage medium configured in a plurality of storage locations addressable with physical page addresses;
  means for receiving a plurality of write requests corresponding to a related write group;
  means for storing a related write request indicator, wherein the related write request indicator is configured to:
    identify a related write group that includes a plurality of physical page addresses; and
    indicate whether the related write group has been stored in the plurality of storage locations corresponding to the plurality of physical page addresses;
  means for processing the plurality of write requests to store a plurality of write data blocks corresponding to the related write group to the plurality of physical page addresses in the non-volatile storage medium; and
  means for updating, responsive to processing the plurality of write requests, the related write request indicator.

* * * * *